US011322019B2

(12) United States Patent
Cho et al.

(10) Patent No.: US 11,322,019 B2
(45) Date of Patent: May 3, 2022

(54) EMERGENCY VEHICLE DETECTION

(71) Applicant: Zoox, Inc., Foster City, CA (US)

(72) Inventors: Nam Gook Cho, Cupertino, CA (US); Subasingha Shaminda Subasingha, San Ramon, CA (US); Jonathan Tyler Dowdall, San Francisco, CA (US); Venkata Subrahmanyam Chandra Sekhar Chebiyyam, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/661,898

(22) Filed: Oct. 23, 2019

(65) Prior Publication Data
US 2021/0125494 A1 Apr. 29, 2021

(51) Int. Cl.
*G08G 1/04* (2006.01)
*G06K 9/62* (2022.01)
*G01S 3/803* (2006.01)

(52) U.S. Cl.
CPC .............. *G08G 1/04* (2013.01); *G01S 3/8032* (2013.01); *G06K 9/628* (2013.01); *G06K 9/6217* (2013.01)

(58) Field of Classification Search
CPC .... G05D 1/0214; G05D 1/021; G05D 1/0212; G05D 1/0255; G05D 2201/0213; G08G 1/0965; G08G 1/166; G08G 1/04; B60W 2050/0043; G01S 3/8032; G06K 9/6217; G06K 9/628
See application file for complete search history.

(56) References Cited

U.S. PATENT DOCUMENTS

| 9,420,368 | B2* | 8/2016 | Stein ...................... H04R 1/326 |
| 2012/0310646 | A1* | 12/2012 | Hu ........................ G10L 15/02 704/238 |
| 2013/0268185 | A1* | 10/2013 | Rabbath .............. G05D 1/0255 701/300 |

(Continued)

FOREIGN PATENT DOCUMENTS

WO      WO2018057765 A1     3/2018

OTHER PUBLICATIONS

PCT Search Report and Written Opinion dated Jan. 28, 2021 for PCT Application No. PCT/US20/56506, 11 pages.

*Primary Examiner* — Hai Phan
*Assistant Examiner* — Anthony D Afrifa-Kyei
(74) *Attorney, Agent, or Firm* — Lee & Hayes, P.C.

(57) ABSTRACT

Techniques for determining a direction of arrival of an emergency are discussed. A plurality of audio sensors of a vehicle can receive audio data associated with the vehicle. An audio sensor pair can be selected from the plurality of audio sensors to generate audio data representing sound in an environment of the vehicle. An angular spectrum associated with the audio sensor pair can be determined based on the audio data. A feature associated with the audio data can be determined based on the angular spectrum and/or the audio data itself. A direction of arrival (DoA) value associated with the sound may be determined based on the feature using a machine learned model. An emergency sound (e.g., a siren) can be detected in the audio data and a direction associated with the emergency relative to the vehicle can be determined based on the feature and the DoA value.

20 Claims, 8 Drawing Sheets

(56) References Cited

U.S. PATENT DOCUMENTS

| | | | |
|---|---|---|---|
| 2016/0071526 A1* | 3/2016 | Wingate | G01S 3/802 704/233 |
| 2016/0097853 A1* | 4/2016 | Kamo | G01S 13/584 342/70 |
| 2017/0092284 A1* | 3/2017 | Nakamura | G10L 15/20 |
| 2017/0120804 A1 | 5/2017 | Kentley et al. | |
| 2017/0222612 A1 | 8/2017 | Zollner | |
| 2017/0259737 A1* | 9/2017 | Jang | G01S 3/8083 |
| 2017/0263126 A1* | 9/2017 | Kim | G10L 25/51 |
| 2018/0047407 A1* | 2/2018 | Mitsufuji | G10L 21/028 |
| 2018/0350391 A1 | 12/2018 | Moore et al. | |
| 2019/0208317 A1* | 7/2019 | Woodruff | G10L 21/028 |
| 2019/0285722 A1* | 9/2019 | Markhovsky | G01S 5/0231 |
| 2019/0294169 A1* | 9/2019 | Shabtai | G08G 1/166 |

* cited by examiner

EMERGENCY VEHICLE DETECTION

BACKGROUND

Vehicles often encounter emergency vehicles in an environment. During an emergency, the emergency vehicle may drive rapidly and may use lights and/or sirens to announce its presence. As the emergency vehicle has a higher priority in driving, non-emergency vehicles should yield to the emergency vehicle. In the context of an autonomous vehicle, it may be important for the autonomous vehicle to have a scheme to detect the emergency vehicle and respond to an occurrence of the emergency vehicle in its environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
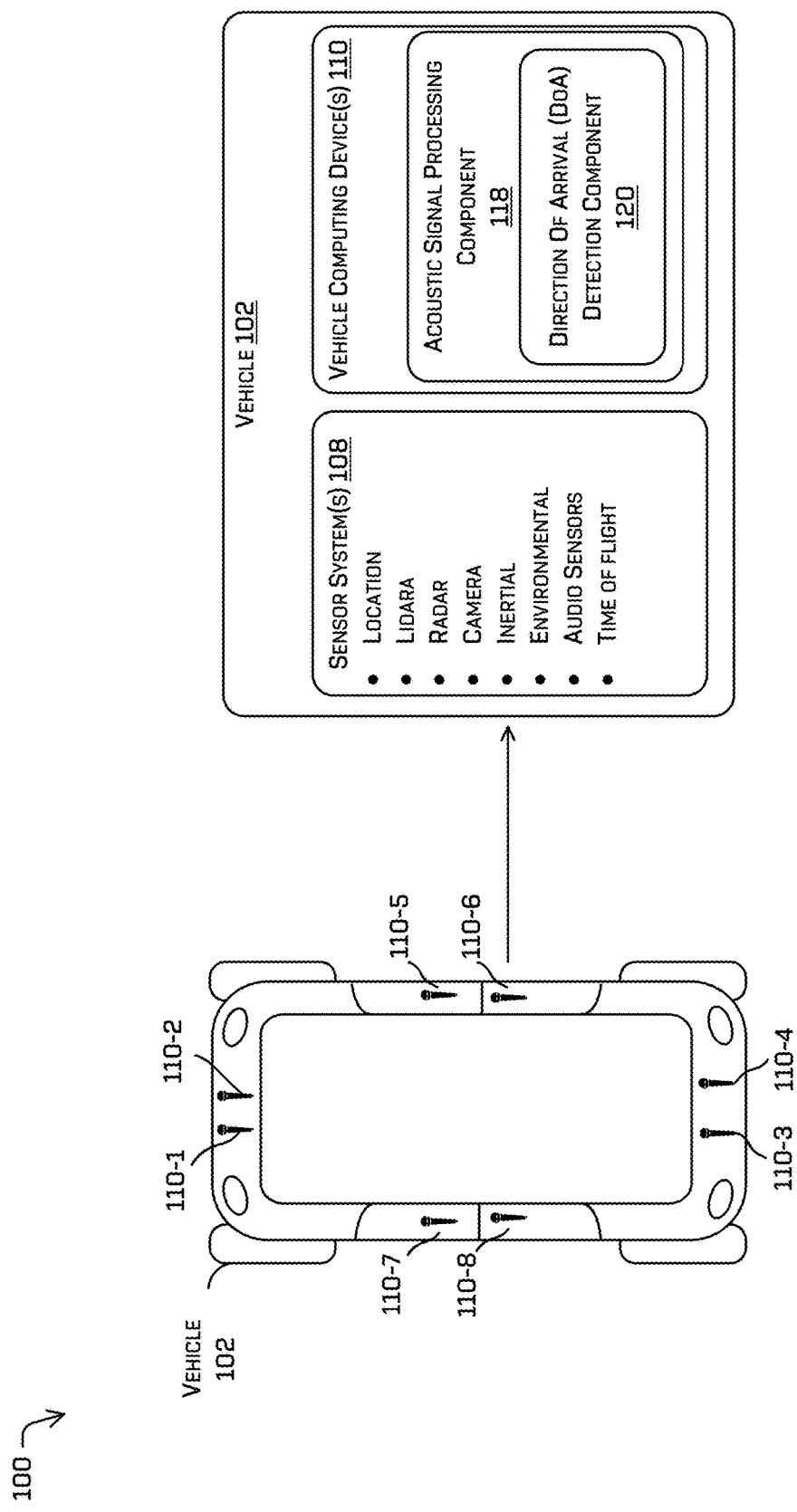
FIG. 1 is a schematic diagram illustrating an example implementation to detect an emergency vehicle in an environment where an autonomous vehicle is located, in accordance with examples of the disclosure.

This disclosure is directed to techniques for determining a direction of arrival (DoA) of an emergency in an environment of a vehicle. The vehicle may be an autonomous vehicle including an audio sensor to capture sounds from the environment. In some examples, the emergency may include one or more emergency vehicles in an environment. The audio sensor may capture sound generated by sirens of the emergency vehicle and may transmit the audio data associated with the sirens to a vehicle computing device either implemented on the vehicle or remotely on a server to determine a DoA of the sirens. As the environment of the vehicle includes various types of sounds such as car noise, siren, human speech, music, thunder, etc., to respond to the sirens efficiently and accurately, one or more audio sensor pairs may be used to capture the audio data associated with the sounds. In some examples, audio sensor pairs may be disposed on a front area, a back area, a left side and a right side of the vehicle to cover all directions around the vehicle. Each of the audio sensor pairs can cover an area of 180-degrees of angle. For example, the audio sensor pair disposed on the front area of the vehicle can cover the front area in the 180-degrees of angle, the audio sensor pair disposed in the back area of the vehicle can cover the back area in the 180-degree of angle, the audio sensor pair disposed on the left side of the vehicle can cover the left side in the 180-degree of angle, and the audio pair disposed on the right side of the vehicle can cover the right side in the 180-degree of angle. Thus, four audio sensor pairs can cover all directions surrounding the vehicle.

In some examples, audio data captured by an audio sensor pair may be analyzed to estimate an angular spectrum of the audio sensor pair. In some examples, more than two audio sensors may be used to estimate the angular spectrum. The angular spectrum may be a parameter that has information about the likelihood of the presence of a sound source in the direction specified by the abscissae, for example, the intensity of sound impinging the vehicle from the DOA or TDOA. As a non-limiting example, a generalized cross correlation with phase transform (GCC-PHAT) algorithm may be implemented to estimate the angular spectrum of the audio sensor pair. However, other algorithms may also be applied to estimate the angular spectrum, for example, cross-power spectrum phase (CPS) algorithm, GCC-PHAT with Fast Fourier Transform (FFT), Machine Learning based algorithms, multiple signal classification (MUSIC), state coherence transform (SCT), etc. The estimation of angular spectrum may be based on the assumption that a DoA of each source in the auditory scene surrounding the vehicle is represented by a single angle from which an audio signal impinges at the audio sensor pair from an audio source in a far field, the audio signal propagates in free field from the audio source to each audio sensor, and a one-to-one mapping exists between a DoA and a time difference of arrival (TDoA). Each peak of TDoA may indicate a TDoA associated with a sound source. In some examples, the computation may be performed in each time-frequency bin for all discrete values of difference in the range of possible TDoAs. The GCC-PHAT algorithm may compute a value for each TDoA in the time-frequency bins associated with the audio data and output the angular spectrum of the audio sensor pair based on the audio data. As the computed TDoA in samples can be converted to DoA in angles, the DoA of an emergency vehicle can be determined based at least in part on the peaks of TDoA. In some examples, when more than two audio sensors are implemented, DoA may be used directly rather than TDoA.

In some examples, at least one feature associated with the audio data is selected based on the angular spectrum. In some examples, the at least one feature may be selected from the angular spectrum of the audio sensor pair itself, peak values of the angular spectrum of the audio sensor pair, TDoA values at the peaks of the angular spectrum, energy values of the audio sensor pairs, etc. In some examples, more than one feature is selected from the angular spectrum to provide more accurate DoA estimation.

In some examples, a neural network component (such as a regression or a classification, for example) may be implemented on audio data received in real-time to generate the DoA value. An internal buffer space may be set to stream the audio data for processing. Audio data captured by the audio sensor(s) may be sent into the buffer space in every frame time in a first-in first-out order. For example, the internal buffer space may be set to store at least 3 seconds of data, although the buffer space may store data of any length of time. In some examples, a frame time can be set as 30 milliseconds, although the frame time can be set as any length of time. The audio data may be streamed into the internal buffer space for every 30 milliseconds audio frame. The internal buffer space may include audio data corresponding to overlapping time intervals. For example, the internal buffer space may be updated in every 10 milliseconds, which causes 20 milliseconds audio data in an overlapping window. For each 30 milliseconds audio frame, the angular spectrum estimation may be performed for the audio sensor pairs based at least in part on the data contained in the audio frame, features determined based at least in part on the angular spectrum, and/or feature fusion to generate the DoA value associated with the 30 milliseconds audio frame.

In some examples, a category of the audio event may be determined based on the DoA value and an audio event classifier. For example, the audio event classifier may classify an event as an emergency event or a non-emergency event and may classify the audio event more specifically within each broad class. The audio event classifier may be trained to determine categories of events. The training of the audio event classifier may be based at least in part on historical data associated with past events which occurred in the environment of the vehicle and/or features/parameters that were used to identify such past events. The features/parameters that were used to identify the past events may be determined based at least in part on the audio data and/or video data captured by the vehicle. For emergency vehicles, the audio event classifier may be a machine learned model that is pre-trained using training data. The training data may comprise past determined sirens generated by the emergency vehicles, audio data associated with the past determined sirens, and features extracted from the audio data that were used to determine the past determined siren of the emergency vehicles. The audio event classifier may be periodically trained using the feedback from identified emergencies in real-time.

In some examples, an audio event can be defined as least in part on a start time associated with the event (e.g., an on-set of the event) and an end time of the event (e.g., an off-set of the event). In some examples, a start time frame indicating an on-set of the emergency and/or an end frame indicating an off-set of the emergency may be determined based on the DoA value. In some examples, whether the emergency vehicle is approaching the vehicle, or the emergency vehicle is leaving the vehicle may be determined based on the DoA value. In some examples, the determination as to whether the emergency vehicle is approaching the vehicle, or the emergency vehicle is leaving the vehicle may be performed using a doppler frequency shifting function. In some examples, the determination as to whether the emergency vehicle is approaching the vehicle, or the emergency vehicle is leaving the vehicle may be performed using an audio sensor data power tracker across multiple frames. In some examples, a combination of the above-mentioned factors, i.e., the power tracker across multiple frames, can be used to make a determination of whether the emergency vehicle is approaching the vehicle or leaving the vehicle. In some examples, the audio data may be integrated with other perception data (e.g., image data, lidar data, radar data, time of flight data, etc.) and the vehicle's velocity information to aid in classifying an audio event, determining a direction associated with the audio event, and the like.

In some examples, based on the collected audio data representing various types of sounds in the environment, multiple events occurring in the environment may be determined. To eliminate ambiguities, such that the vehicle can respond quickly and accurately to the sirens, the multiple events may be scrutinized according to preset rules. The sirens of an emergency vehicle, in general, have dominant sound levels when compared to all other sounds in the environment and can be heard hundreds of meters, even before the emergency vehicle can be seen. As the vehicle captures audio data representing an emergency vehicle in the environment, a length of the sound may be evaluated to determine whether a sound corresponds to an audio event. Occasionally in the environment, there may be other sound sources that generate siren like sounds or the driver of the emergency vehicle may accidentally operate the siren. To avoid confusion caused by such potential false sirens, the audio data associated with those such potential false sirens may be removed for analysis. In some examples, the audio data continuously received in a time domain may be discretized into a plurality of audio frames. An audio event may be determined to occur on a start time frame during which, an on-set of a sound is determined and end on an end time frame during which, an off-set of the sound is determined. The plurality of audio frames may be input to an internal buffer space. If a count of the audio frames associated with an audio event is less than the threshold value, the event may be determined to be a non-event. In some examples, although the emergency vehicle may have to continuously sound the sirens until a destination is reached, sometimes miles away, some intermittent silences between sounds may occur. To account for such potential gaps in audio, if a count of the audio frames between two adjacent events is less than a minimum frame gap (which may be pre-defined for the siren signals) the audio frame gap may be removed, and the adjacent events may be merged. In an alternate solution to account for potential gaps in audio, a state-based or a long-context machine learning model can be used to maintain state of the detection even during silences. This machine learning model may be trained on data which includes siren sounds with intermittent gaps and hence may be learned to be robust to gaps.

The techniques discussed herein can improve a functioning of a computing device of a vehicle in a number of ways. As the audio sensors of the vehicle can capture the sound generated by sirens before other sensors, such as cameras, lidar and radar, utilizing the audio data collected by the audio sensors on the vehicle can improve the response speed to an emergency. For example, in the context of generating a direction of arrival of an emergency, utilizing various audio sensor pairs to collect the audio data and analyzing the features associated with the angular spectra of the various audio sensor pairs can improve the accuracy and/or reduce a latency for the vehicle to respond to the emergency in the environment. Further, some emergency vehicles, such as undercover vehicles, may not provide visual indications of an emergency. The techniques discussed herein can facilitate the vehicle to respond to the emergency even when an emergency vehicle is occluded and/or in the dark at night.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using audio data. Additionally, the techniques described herein can be used with real data (e.g., captured using sensor(s)), simulated data (e.g., generated by a simulator), or any combination of the two.

FIG. 1 is a schematic diagram illustrating an example implementation 100 to detect an emergency vehicle in an environment where the autonomous vehicle is located, in accordance with embodiments of the disclosure.

As illustrated in FIG. 1, a vehicle 102 may include one or more audio sensors (e.g., 110-1, 110-2, 110-3, 110-4, 110-5, 110-6, 110-7, and 110-8) that generate audio data representing sound in an environment where the vehicle 102 is located.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle can be associated with sensor system(s) 108 that can be disposed on the vehicle 102. The sensor system(s) 108 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, audio sensors (e.g., audio sensors 110-1, 110-2, 110-3, 110-4, 110-5, 110-6, 110-7, and 110-8), environment sensors (e.g., temperature sensors, humidity sensors, light sensors, pressure sensors, etc.), etc. The sensor system(s) 108 can generate sensor data, which can be utilized by vehicle computing device(s) 110 associated with the vehicle 102.

Figure 2:
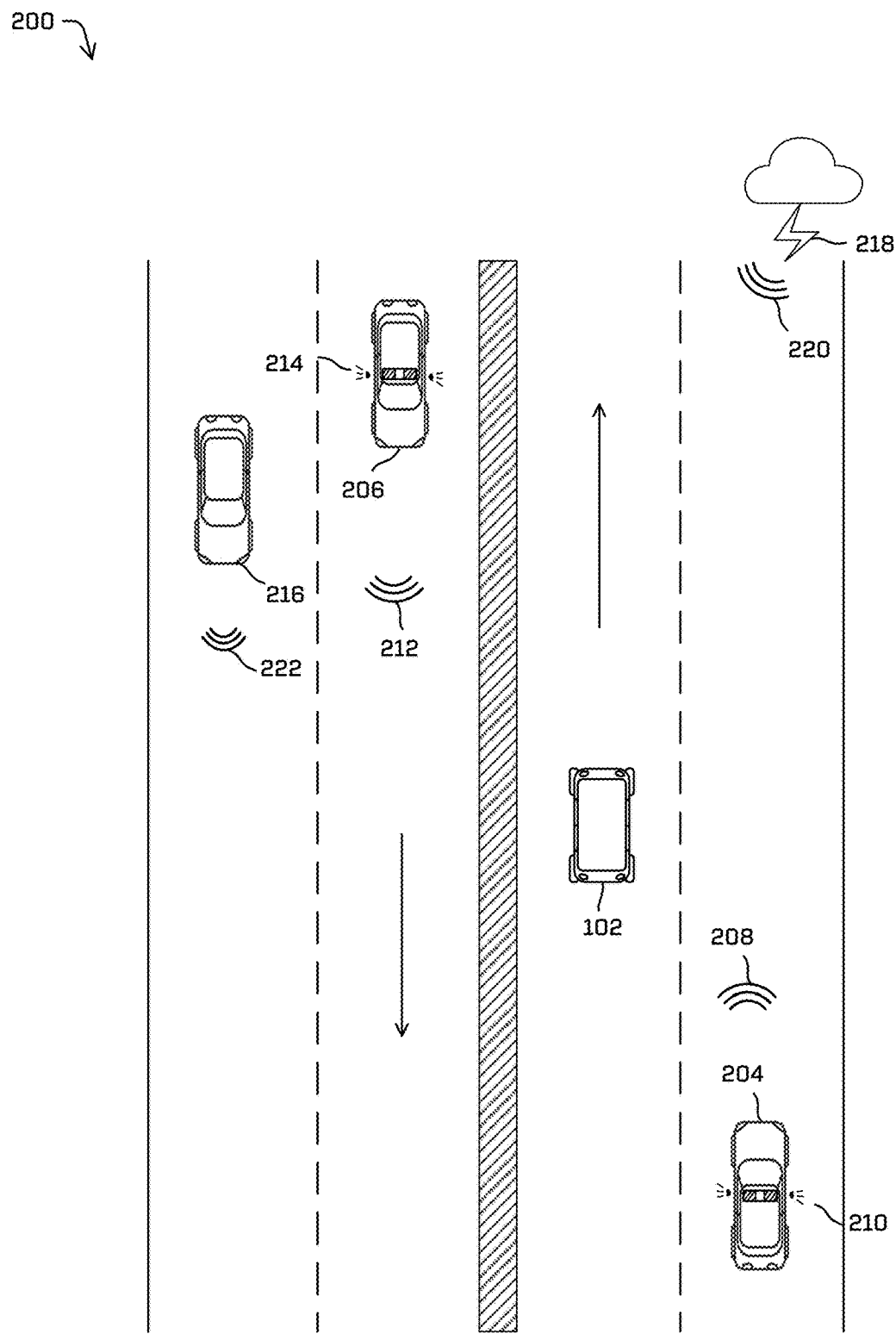
FIG. 2 is a pictorial diagram illustrating an example implementation to detect an emergency vehicle in an environment where the autonomous vehicle is located, in accordance with examples of the disclosure.

In at least one example, the vehicle computing device(s) 110 may determine a direction of arrival (DoA) of an audio source in the environment based at least in part on audio data received from the sensor system(s) 108 associated with the vehicle 102. Referring to FIG. 2, the computing device(s) 110 of the vehicle 102 may identify one or more audio source(s) in the environment 200. The audio source(s) may include at least a vehicle 204 driving in a same direction as the vehicle 102, a vehicle 206 and a vehicle 216 driving in an opposite direct of the vehicle 102, a thunder 218 from the sky, etc. In some examples as illustrated in FIG. 2, the vehicle 204 driving in a same direction as the vehicle 102 and the vehicle 206 driving in an opposite direction as the vehicle 102 may be emergency vehicles. Emergency vehicle(s) designated and authorized to respond to an emergency in a life-threatening situation may include, but are not limited to a police car, a police motorcycle, a special weapons and tactics (SWAT) vehicle, a firefighting apparatus, an ambulance, etc. Emergency vehicle(s) may be configured with audible and visual warning devices, which are designed to facilitate their movements through traffic to reach the destination or to provide certain protection on the scene.

The computing device(s) 110 of the vehicle 102 may receive audio data representing sound generated by the audio source(s) in the environment, for example, sound 212 from the emergency vehicle 206, sound 222 from the vehicle 216, sound 220 from the thunder 218, sound 208 from the emergency vehicle 204, etc. The sound 222 may be the sound generated from the vehicle 216, for example, the engine sound, the belt noise, the tire noise, music, human speech, dog barking, etc. The sound 212 may be the sound generated from the emergency vehicle 206, for example, the siren sound, the engine sound, the belt noise, the tire noise, music, human speech, dog barking, etc. The siren sound may be dominant among all the sounds generated by an emergency vehicle.

The audio data, i.e., the raw audio data, from the audio source(s) in the environment of the vehicle 102 may be collected, captured, received, or otherwise determined by the audio sensor(s) 110-1, 110-2, 110-3, 110-4, 110-5, 110-6, 110-7, and 110-8. The raw audio data or the raw data may refer to audio data or data captured by the audio sensors that may be uncompressed. Alternatively, the raw audio data and the raw data may refer to audio data or data captured by the audio sensors that may be compressed but that otherwise remain unprocessed. As illustrated in FIG. 1, audio sensor pair [110-1, 110-2] are disposed on a front area of the vehicle 102, audio sensor pair [110-3, 110-4] are disposed on a back area of the vehicle 102, audio sensor pair [110-5, 110-6] are disposed on a right side of the vehicle 102, and audio sensor pair [110-7, 110-8] are disposed on a left side of the vehicle 102. The front area, the back area, the left side and the right side are with respect to a direction of driving of the vehicle 102. Each of the audio sensor pairs can cover an area of 180-degree of angle, although audio sensors may be associated with any coverage range. In some examples, the audio sensor pair [110-1, 110-2] can cover the front area of the vehicle 102 in the 180-degree of angle, the audio sensor pair [110-3, 110-4] can cover the back area of the vehicle 102 in the 180-degree of angle, the audio sensor pair [110-5, 110-6] can cover the right side of the vehicle 102 in the 180-degree of angle, and the audio pair [110-7, 110-8] can cover the left side of the vehicle 102 in the 180-degree of angle. Thus, the audio sensors illustrated in FIG. 1 can cover all directions surrounding the vehicle 102, i.e., 360-degree of angle.

It should be understood that the audio sensors in FIG. 1 are for the purpose of illustration. A different number of audio sensors may be disposed on the vehicle. The positions of those audio sensors being disposed on the vehicle may vary. The forming of audio sensor pairs or the forming of a set of audio sensors comprising more than two audio sensors may be determined in accordance with a size and/or the computing capacity of the vehicle computing device(s) 110. It should also be understood that the environment where the vehicle 102 is located in FIG. 2 is for the purpose of illustration. There may be other audio sources in the environment that also contribute to generating audio signals, for example, constructions on the driving path or in a nearby building, car accident on the driving path, etc. The present disclosure is not intended to be limiting.

In some examples, the computing device(s) 110 of the vehicle 102 may include an acoustic signal processing component 118 that processes the audio data or audio signal representing the sound in an environment. The acoustic signal processing component 118 may include a DoA detection component 120. The DoA detection component 120 may receive the audio data representing sound from the environment from the audio sensor(s) 110-1, 110-2, 110-3, 110-4, 110-5, 110-6, 110-7, and 110-8. The DoA detection component 120 may select one or more audio sensor pairs from the above-noted four audio sensor pairs. In some examples, the DoA detection component 120 may form one or more additional audio sensor pairs by pairing two audio sensors respectively selected from the above-noted audio sensors 110-1 to 110-8. For example, the DoA detection component 120 may form an additional audio sensor pair [110-1, 110-7], where audio sensor 110-1 and audio sensor 110-7 are respectively selected from audio sensor pair [110-1, 110-2] and audio sensor pair [110-7, 110-8]. The DoA detection component 120 may estimate an angular spectrum of the audio sensor pair based at least in part on the audio data. In some examples, the DoA detection component 120 may use a generalized cross correlation with phase transform (GCC-PHAT) algorithm to estimate the angular spectrum of the audio sensor pair, although other techniques are discussed herein.

In some examples, the DoA detection component 120 may perform the estimation of angular spectrum based at least in part on the assumption that 1) a DoA is represented by a single angle from which an audio signal impinges at the audio sensor pair from an audio source in a far field, 2) the audio signal propagates in free field from the audio source to each audio sensor, and/or 3) a one-to-one mapping exists between a DoA and a time difference of arrival (TDoA). The GCC-PHAT algorithm may compute a value for each DoA associated with the audio data and output the angular spectrum of the audio sensor pair based at least in part on the audio data. It should be understood that the GCC-PHAT algorithm is used for the purpose of illustration. Other algorithms may also be applied to estimate the angular spectrum, for example, cross-power spectrum phase (CPS) algorithm, GCC-PHAT with Fast Fourier Transform (FFT), etc.

The DoA detection component 120 may determine a feature associated with the audio data based at least in part on the angular spectrum. In some examples, the feature may be selected from the angular spectrum of the audio sensor pair itself, peak values of the angular spectrum of the audio sensor pair, TDoA values at the peaks of the angular spectrum, energy values of the audio sensor pairs, etc. In some examples, the DoA detection component 120 may select one or more features from the angular spectrum to provide more accurate DoA estimation. In some other examples, the DoA detection component 120 may determine a feature associated with the audio data based at least in part on the raw audio data. The feature may be selected from the angular spectrum of the audio sensor pair itself, peak values of the angular spectrum of the audio sensor pair, TDoA values at the peaks of the angular spectrum, energy values of the audio sensor pairs, a frequency spectrum, a noise floor, a noise spectrum, a zero crossing, an energy distribution, a cross correlation, a machine learned embedding, etc. The DoA detection component 120 may perform a DoA value determination based at least in part on the one or more features. In some examples, the DoA detection component 120 may determine an occurrence of an emergency (or non-emergency) and a direction associated with the audio event relative to the vehicle in the environment based at least in part on the one or more features and the DoA value.

In some examples, the DoA detection component 120 may input the audio data into a machine learned model, such as a neural network, to generate the DoA value. An internal buffer space may be set to stream the audio data for processing. Audio data received by the audio sensor(s) may be input into the buffer space (e.g., in a first-in first-out (FIFO) order) whereby audio data can be associated with audio frames. For example, the internal buffer space may correspond to 3 seconds of audio data and an audio frame may correspond to 30 milliseconds of data, although any time periods can be used. For each audio frame, the DoA detection component 120 may perform angular spectrum estimation for the audio sensor pairs based at least in part on the data contained in the audio frame, feature determination based at least in part on the angular spectrum, and/or feature fusion to generate the DoA value associated with the audio frame.

Figure 4:
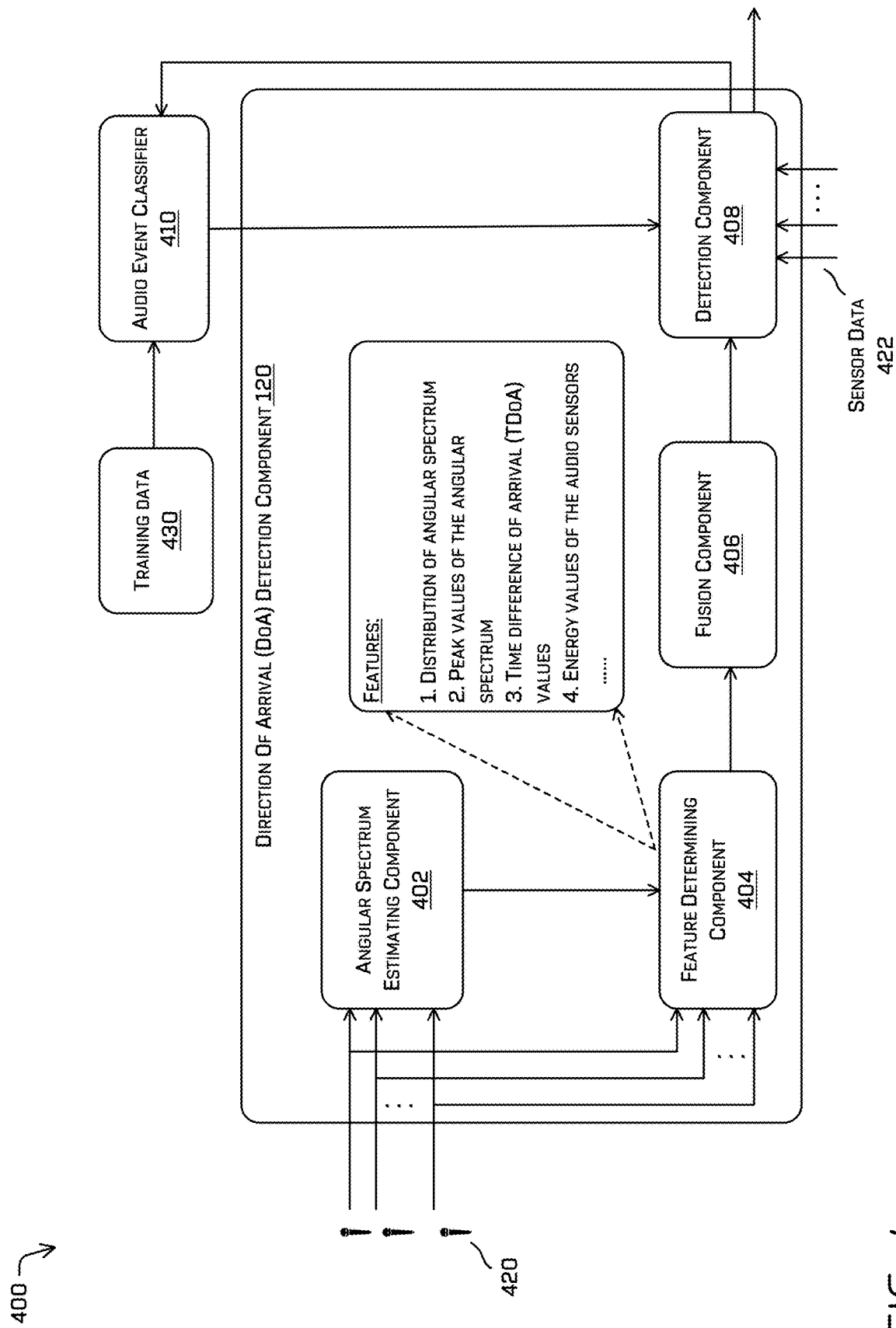
FIG. 4 depicts a block diagram of an example implementation to detect an emergency vehicle in an environment where the autonomous vehicle is located, in accordance with examples of the disclosure.

In some examples, a category of the emergency (or non-emergency) may be determined based at least in part from the DoA value and an audio event classifier (e.g., 410 in FIG. 4). The audio event classifier may be a pre-trained component to determine categories of events. The training of the audio event classifier may be based at least in part on historical data associated with past events which occurred in the environment of the vehicle and features/parameters that were used to identify the past events. The features/parameters that were used to identify the past events may be determined based at least in part on the audio data, video data, lidar data, radar data, etc. captured by the vehicle. For emergency vehicles, the audio event classifier may be trained using past emergency vehicles and features that were used to identify those past emergency vehicles and associated with audio data (or other data) representing the siren of the emergency vehicles. The audio event classifier may be periodically trained using the feedback from identified emergencies in real-time.

In some examples, the classification of the audio event may include an emergency audio event class comprising an ambulance siren class, a police siren class, a fire truck siren class, etc., or a non-emergency audio event class comprising an engine sound class, a music sound class, a thundering sound class, a speech sound class, etc.

In some examples, based on the collected audio data representing various types of sounds in the environment, the DoA detection component 120 may determine multiple events. To eliminate ambiguities, so that the vehicle can respond quickly and accurately to the sirens, the DoA detection component 120 may further analyze the multiple events according to preset rules. The sirens of an emergency vehicle in general have dominant sound levels relative to all other sounds in the environment. The emergency vehicle may alert other vehicles and/or objects (e.g., pedestrians, animals, etc.) in the environment by sounding sirens, and the length of the siren may be preset to above a threshold value such that the other vehicles can be alerted. A short siren, i.e., the length of the siren below the threshold value may be missed by the other vehicles or may cause confusion. To avoid confusion caused by such potential false sirens, if an event is detected based on the audio data but a count of the audio frames associated with the event is less than the threshold value, the event may be determined as a non-event. When the audio data is determined to correspond to a non-event, the audio frames associated with the non-event may be removed from further processing to determine the direction of arrival.

In some examples, although the emergency vehicle may have to continuously sound the sirens until a destination is reached, sometimes miles away, some intermittent silences between sounds may occur. In some examples, if a count of the audio frames between two adjacent events is less than a minimum frame gap (which may be pre-defined for the siren signals) the potential silent frames (which may be referred to as an audio frame gap) may be removed, and the adjacent events may be merged.

In some examples, the DoA detection component 120 may determine an emergency vehicle by integrating the audio data with detection of flashing lights associated with the emergency vehicle, for example, flashing light signals 210 and 214, as illustrated in FIG. 2 or sensor data from other perception system 422 as illustrated in FIG. 4. It should be understood that other perception pipelines may be also integrated with the audio data to determine the occurrence of the emergency vehicle. In one example, image data can be captured, and an emergency vehicle can be detected in the image data.

Figure 3:
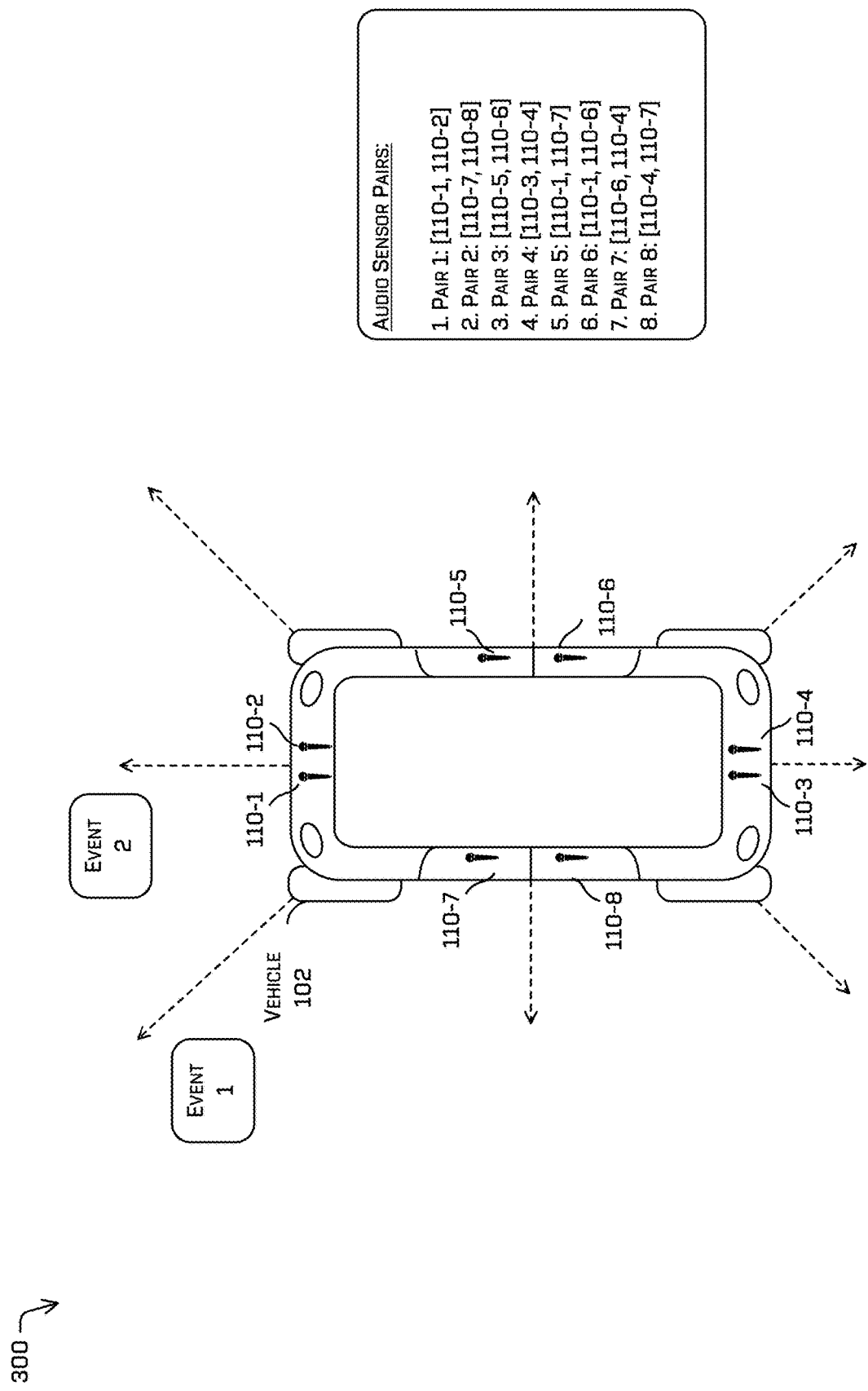
FIG. 3 is an illustration of selecting audio sensor pairs to detect an emergency vehicle in an environment where the autonomous vehicle is located, in accordance with examples of the disclosure.

FIG. 3 is an illustration 300 of exemplary audio sensor pairs for implementation to detect an emergency vehicle in an environment where the autonomous vehicle is located, in accordance with embodiments of the disclosure.

As illustrated in FIG. 3, Event 1 and Event 2 may occur in the environment of vehicle 102. Event 1 and Event 2 may represent siren signals (or other sounds) generated from their respective directions. To determine the direction of Event 2 with Event 1 present, multiple audio sensor pairs may be formed to capture the siren signals. In some examples, the DoA detection component 120 may determine an approximate direction of the siren signals and select audio sensor pairs based at least in part on the approximate direction of the siren signals. As illustrated in FIG. 3, eight audio sensor pairs are formed to determine the direction of Event 2 with Event 1 present: pair [110-1, 110-2], [110-7, 110-8], [110-5, 110-6], [110-3, 110-4], [110-1, 110-7], [110-1, 110-6], [110-6, 110-4], and [110-4, 110-7]. It should be understood that the audio sensor pairs may be formed based on any combinations of the audio sensors disposed on the vehicle 102. Selecting certain audio sensor pairs to determine the direction of the siren signal may allow the vehicle 102 to achieve a quick and efficient response to the emergency vehicle. It should be further understood that forming an audio sensor pair comprising two audio sensors are for the purpose of illustration. In some examples, more than two sensors may be used to determine the direction of arrival of an audio event.

FIG. 4 depicts a block diagram 400 of an example implementation to detect an emergency vehicle in an environment where the autonomous vehicle is located, in accordance with embodiments of the disclosure.

As illustrated, the DoA detection component 120 may include an angular spectrum estimating component 402 to receive audio data collected by the audio sensor(s) 420 and estimate an angular spectrum of the audio sensor pair(s) based at least in part on the audio data. In some examples, the DoA detection component 120 may use a generalized cross correlation with phase transform (GCC-PHAT) algorithm to estimate the angular spectrum of the audio sensor pair(s). The angular spectrum estimating component 402 may perform the estimation of angular spectrum based at least in part on the assumption that a DoA is represented by a single angle from which an audio signal impinges at the audio sensor pair from an audio source in a far field, the audio signal propagates in free field from the audio source to each audio sensor, and a one-to-one mapping exists between a DoA and a time difference of arrival (TDoA). The angular spectrum estimating component 402 may compute a value for each DoA associated with the audio data and output the angular spectrum of the audio sensor pair based at least in part on the audio data. It should be understood that the GCC-PHAT algorithm is used for the purpose of illustration. Other algorithms (including algorithms involving usage of data collected from two or more microphones) may also be applied to estimate the angular spectrum, for example, cross-power spectrum phase (CPS) algorithm, GCC-PHAT with Fast Fourier Transform (FFT), etc.

In some examples, the DoA detection component 120 may include a feature determining component 404 that determines a feature associated with the audio data based at least in part on the angular spectrum and/or the audio data. In some examples, the computation of the angular spectrum may be skipped completely as a part of the DoA detection component 120. In such cases, the DoA detection component 120 may determine the DoA directly based on the audio data collected by the audio sensor(s) 420, i.e., based on the raw audio data. In some examples, the feature determining component 404 may determine a feature associated with the audio data based at least in part on the angular spectrum of the audio sensor pair. In some other examples, the feature determining component 404 may determine a feature associated with the audio data based at least in part on the raw audio data. In some examples, the feature may be selected from the angular spectrum of the audio sensor pair itself, peak values of the angular spectrum of the audio sensor pair, TDoA values at the peaks of the angular spectrum, energy values of the audio sensor pairs, a frequency spectrum, a noise floor, a noise spectrum, a zero crossing, an energy distribution, a cross correlation, a machine learned embedding, etc. In some examples, the feature selection may be performed using a machine learned model based at least on the raw data input (e.g., the audio data). In some examples, the feature determining component 404 may select one or more features from the angular spectrum to provide more accurate DoA estimation. In some other examples, the feature determining component 404 may determine a feature associated with the audio data based at least in part on the raw audio data. The feature may be selected from the angular spectrum of the audio sensor pair itself, peak values of the angular spectrum of the audio sensor pair, TDoA values at the peaks of the angular spectrum, energy values of the audio sensor pairs, a frequency spectrum, a noise floor, a noise spectrum, a zero crossing, an energy distribution, a cross correlation, a machine learned embedding, etc. In some examples, the feature determining component 404 may construct a set of vectors as a feature set to be inputted to a fusion component 406 of the DoA detection component 120.

The fusion component 406 performs fusion operations on one or more features to generate the DoA value associated with the audio. In some examples, the fusion component 406 may input audio data received in real-time to a machine learned model to generate the DoA value. The DoA value may indicate an angular direction from which the sound is originated. An internal buffer may be set to stream the audio data for processing. Audio data received by the audio sensor(s) may be pushed into the buffer a first-in first-out order. The buffer may be subdivided into a plurality of frames. For example, the internal buffer may be set as a 3 seconds data cue and divided into frames of 30 milliseconds. For each audio frame, the angular spectrum estimating component 402 may perform angular spectrum estimation for the audio sensor pairs based at least in part on the data contained in the audio frame, and feature determining component 404 may perform feature determination based at least in part on the angular spectrum and/or the buffer data construct a set of vectors as a feature set. The fusion component 406 may perform feature fusion to generate the DoA value associated with the audio frame. It should be understood that the size of the internal buffer described herein is for the purpose of illustration. The internal buffer may be sized to store 5 seconds, 10 seconds, or any other amount of audio data. The present disclosure is not intended to be limiting.

In some examples, the DoA detection component 120 may include a detection component 408 that determines an occurrence of an emergency and a direction associated with the emergency relative to the vehicle based at least in part on the feature and the DoA value. In some examples, the detection component 408 may determine a category of the emergency based at least in part from the DoA value and an audio event classifier 410. In some examples, the sensor data from other perception systems 422 may be inputted to the detection component 408 to determine the direction of arrival of an audio sound. The sensor data from other perception systems 422 may comprise data captured by one or more of a lidar sensor, a radar sensor, an image sensor, a time of flight sensor, a sonar sensor, and the like. In some examples, additional environmental data may be received (e.g., map data of the environment encoding portions such as lanes, reference lines, crosswalks, traffic devices and/or signs, and the like). The vehicle may be further controlled based at least in part on the direction of the emergency relative to the vehicle. For example, the vehicle may be controlled to reduce velocity, stop, pull over, or change to another lane in response to the emergency.

The audio event classifier 410 may be a pre-trained module to determine categories of the audio events (e.g., whether the audio comprises an emergency vehicle and/or a type of emergency vehicle—ambulance, firetruck, police siren, etc.) The training of the audio event classifier may be based at least in part on training data 430 comprising historical data associated with past events (e.g., which may be from a log of previously recorded data) and features/ parameters associated therewith. The features/parameters that were used to identify the past events may be determined based at least in part on the audio data and/or video data captured by the vehicle. In some examples, the training data 430 may comprise past audio event classification results (e.g., whether the audio event is an emergency audio event or a non-emergency audio event, whether the emergency audio event is related to a firetruck, an ambulance, a police vehicle, etc.) For emergency vehicles, the audio event classifier 410 may be trained using audio data associated with past emergency vehicles and features derived therefrom associated with audio data representing the siren of the emergency vehicles. The audio event classifier 410 may be periodically trained using the feedback from identified emergencies in real-time. The detection component 408 may determine a start time frame indicating an on-set of the emergency based at least in part on the DoA value and an end frame indicating an off-set of the emergency based at least in part on the DoA value. In some examples, the detection component 408 may determine whether the emergency vehicle is approaching the vehicle 102, or the emergency vehicle is leaving the vehicle 102 based at least in part on the DoA value using a doppler frequency shifting function.

In some examples, gaps between frames can be removed to combine adjacent audio events and/or audio events associated with a time period or number of frames below a threshold can be removed, as discussed herein. In some examples, such processing can be performed by the detection component 408, or other components discussed herein.

In some examples, the detection component 408 may determine that an audio event comprises an emergency event by integrating the audio data with the sensor data from other perception system 422, as discussed herein. For example, image data can be captured and processed to determine a presence of flashing lights in the environment associated with a vehicle. A DoA value associated with an audio event may be associated with a first direction relative to the vehicle in the environment. If the image data indicates that a flashing light (e.g., indicative of an emergency vehicle) is located with the first direction, the detection component 408 may increase a confidence value that the audio event is associated with an emergency event. In some examples, the color of the flashing lights may be determined to assist classifying the emergency class. For example, if the flashing lights are determined to be all red, the emergency class may be related to a firetruck. In another example, if the flashing lights are determined to be red and blue, the emergency class may be related to a police car. It should be understood that other perception pipelines may be also integrated with the audio data to determine the occurrence of the emergency vehicle. For example, lidar sensor data may be received and input to a machine learned model trained to determine a presence of an emergency vehicle in an environment. The block diagram of an example implementation to detect an audio event and/or an emergency event in an environment as illustrated in FIG. 4 may include one or more components that process other perception data for the estimation of DoA.

Figure 5:
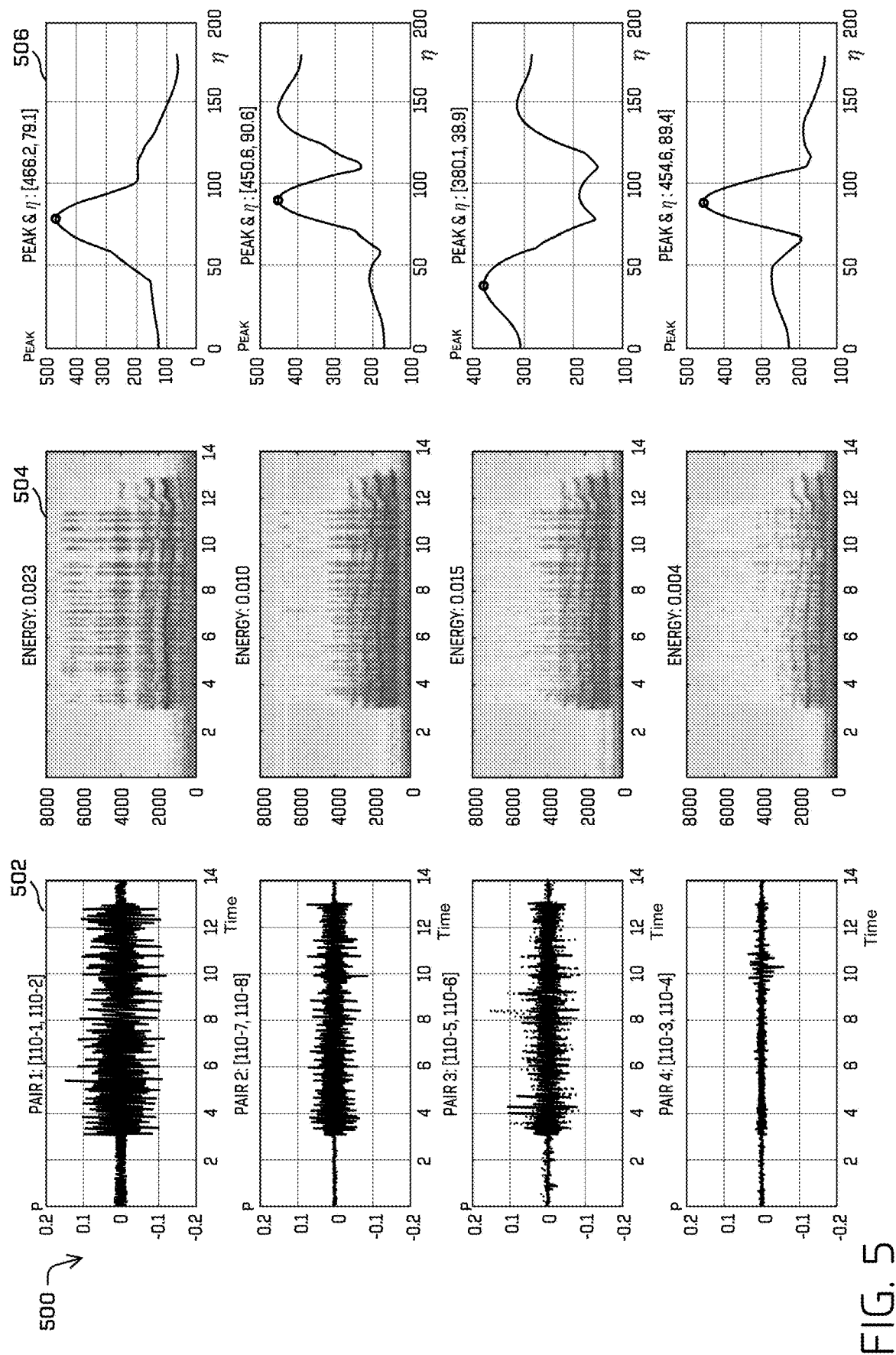
FIG. 5 is an illustration of example features associated with audio signals detected by four audio sensor pairs, in accordance with examples of the disclosure.

FIG. 5 is an illustration 500 of the features associated with audio signals detected by four audio sensor pairs, in accordance with examples of the disclosure.

FIG. 5 illustrates the features associated with the audio data collected by four audio sensor pairs: [110-1, 110-2], [110-7, 110-8], [110-3, 110-4], and [110-5, 110-6] to estimate DoA of Event 2 illustrated in FIG. 3. Column 502 illustrates two channel audio signals received at the audio sensor pairs. Column 504 illustrates spectral analysis of the two channel audio signals and their average values of the audio signal energy. Column 506 illustrates an angular spectrum representing the peak value and angle where the peak value occurs. The angle value shown in column 506 is converted from TDoA value for illustration purpose.

As Event 2 occurs in the front area of the vehicle 102, the audio sensor pair [110-1, 110-2] disposed on the front area of the vehicle 102 demonstrates the strongest audio signal among the four audio sensor pairs in a time period when Event 2 is present, as shown in column 502. The audio sensor pair [110-1, 110-2] disposed on the front area of the vehicle 102 further demonstrates the highest energy level among the four audio sensor pairs in a time period when Event 2 is present, as shown in column 504.

Column 506 also shows that the audio signal received at the audio sensor pair [110-1, 110-2] peaks at an energy of 466.2 at an angle of 79.1. The audio sensor pair [110-7, 110-8] disposed on the left side of the vehicle 102 demonstrates the second strongest audio signal among the four audio sensor pairs in a time period when Event 2 is present and a lower energy level than the audio sensor pair [110-1, 110-2]. Column 506 also shows that the audio signal received at the audio sensor pair [110-7, 110-8] peaks at an energy of 450.6 at an angle of 90.6. Both audio sensor pairs [110-1, 110-2] and [110-7, 110-8] demonstrate a dominant audio signal representing Event 2 even Event 1 is also present nearby, as shown in column 502. The audio sensor pair [110-5, 110-6] disposed on the right side of the vehicle 102 demonstrates mixed audio signals representing Event 1 and Event 2. The audio sensor pair [110-5, 110-6] demonstrates a similar energy level as the audio sensor pair [110-7, 110-8]; however, the audio signal received at the audio sensor pair [110-5, 110-6] peaks at an angle deviating from the audio sensor pairs [110-1, 110-2] and [110-7, 110-8]. The audio sensor pair [110-3, 110-4] disposed on the back area of the vehicle 102 demonstrates the weakest audio signal and the lowest energy level among the four audio sensor pairs; however, the audio signal received at the audio sensor pair [110-3, 110-4] peaks at an angle close to those of audio sensor pairs [110-1, 110-2] and [110-7, 110-8].

Figure 6:
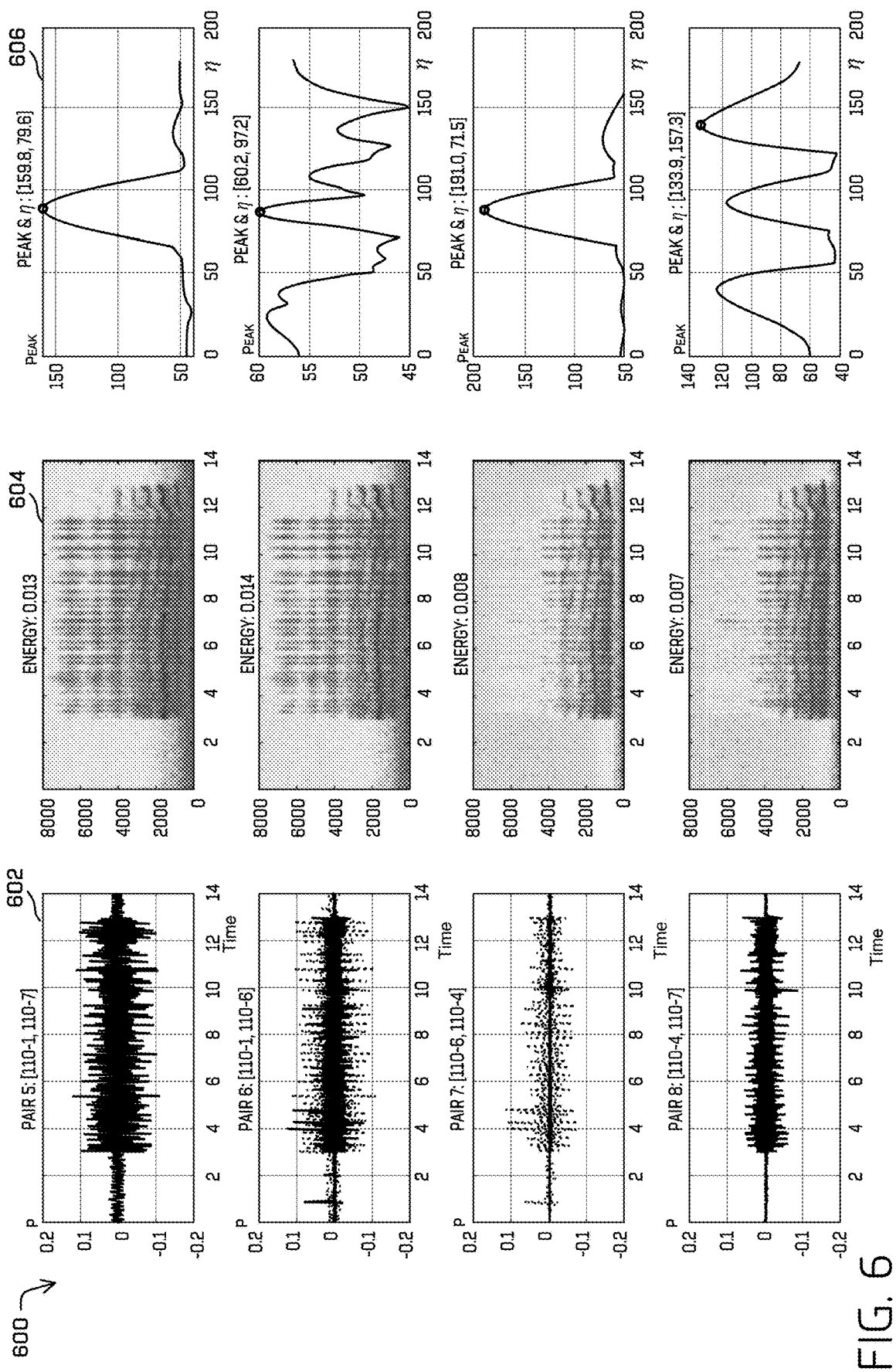
FIG. 6 is an illustration of example features associated with audio signals detected by other four audio sensor pairs, in accordance with examples of the disclosure.

FIG. 6 is an illustration 600 of the features associated with audio signals detected by other four audio sensor pairs, in accordance with examples of the disclosure. Column 602 illustrates two channel audio signals received at the audio sensor pairs. Column 604 illustrates spectral analysis of the two channel audio signals and their average values of the audio signal energy. Column 606 illustrates an angular spectrum representing the peak value and angle where the peak value occurs. The angle value shown in column 506 is converted from TDoA value for illustration purpose.

FIG. 6 illustrates the features associated with the audio data collected by four audio sensor pairs: [110-1, 110-7], [110-1, 110-6], [110-6, 110-4], and [110-4, 110-7] to estimate DoA of Event 2 illustrated in FIG. 3. The audio sensor pair [110-1, 110-7] is formed by one audio sensor from the front area of the vehicle 102 and one audio sensor from the left side of the vehicle 102. Comparing to the audio sensor pair [110-1, 110-2] disposed on the front area of the vehicle 102, the audio sensor pair [110-1, 110-7] demonstrates a lower energy level and the audio signal received at the audio sensor pair [110-1, 110-7] peaks at an angle deviating from the audio sensor pair [110-1, 110-2]. The audio sensor pair [110-1, 110-6] is formed by one audio sensor from the front area of the vehicle 102 and one audio sensor from the right side of the vehicle 102. Comparing to the audio sensor pair [110-1, 110-2] disposed on the front area of the vehicle 102, the audio sensor [110-1, 110-6] demonstrates mixed audio signals representing Event 1 and Event 2, a lower energy level, and the audio signal received at the audio sensor pair [110-1, 110-6] peaks at an angle deviating from the audio sensor pair [110-1, 110-2]. The audio sensor pair [110-6, 110-4] is formed by one audio sensor from the right side of the vehicle 102 and one audio sensor from the back area of the vehicle 102. Comparing to the audio sensor pair [110-1, 110-2] disposed on the front area of the vehicle 102, the audio sensor pair [110-6, 110-4] also demonstrates mixed audio signals representing Event 1 and Event 2, a lower energy level, and the audio signal received at the audio sensor pair [110-6, 110-4] peaks at an angle deviating from the audio sensor pair [110-1, 110-2]. The audio sensor pair [110-4, 110-7] is formed by one audio sensor from the back area of the vehicle 102 and one audio sensor from the left side of the vehicle 102. Comparing to the audio sensor pair [110-1, 110-2] disposed on the front area of the vehicle 102, the audio sensor pair [110-4, 110-7] demonstrates a dominant audio signal in column 502 but with a lower energy level and the audio signal received at the audio sensor pair [110-4, 110-7] peaks at an angle deviating from the audio sensor pair [110-1, 110-2].

As illustrated in FIG. 5 and FIG. 6, the audio signals received at the audio sensor pairs [110-1, 110-2], [110-3, 110-4], [110-1, 110-7] and [110-6, 110-4] demonstrate a single peak while the audio signals received at the audio sensor pairs [110-7, 110-8], [110-5, 110-6], [110-1, 110-6] and [110-4, 110-7] peak at more than one angle. Multiple peaks cause ambiguity in determining the DoA of an emergency vehicle. Further, by comparing the energy level and peak angle, the audio sensor pair [110-1, 110-2] disposed on the front area of the vehicle 102 provides the best estimation of an orientation from where the emergency presents. Because the audio sensor pair [110-1, 110-2] demonstrates a single peak with a highest energy at one angle and the rest of the audio pairs are not inconsistent, the DoA component may determine a direction of arrival of a sound based on the audio sensor pair [110-1, 110-2]. It should be understood that the audio sensor pairs can be selected or formed based on all possible combinations of the audio sensors disposed on the vehicle. The examples illustrated in FIG. 5 and FIG. 6 are for the purpose of illustration. The present disclosure is not intended to be limiting.

Figure 7:
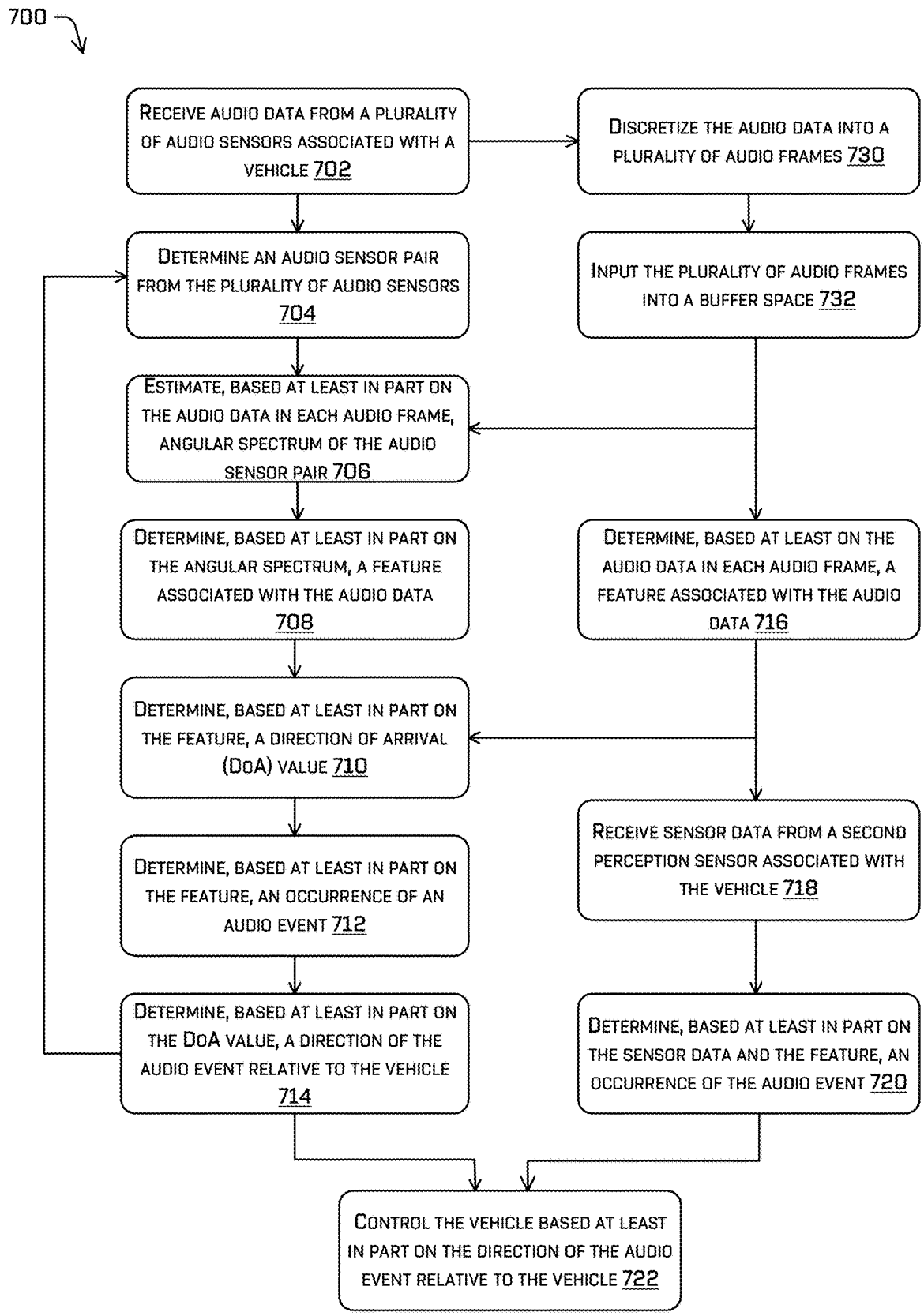
FIG. 7 depicts an example process for detecting an emergency vehicle based on audio signals detected by the audio sensor pairs, in accordance with examples of the disclosure.

FIG. 7 depicts an example process 700 for detecting an emergency vehicle based on the audio signals detected by the audio sensor pairs, in accordance with embodiments of the disclosure. The operations described herein with respect to the process for detecting an emergency vehicle may be performed by a vehicle computing device(s) 110, as illustrated in FIG. 1. In some examples, the operations may be performed by a direction of arrival (DoA) detection component 120 of the vehicle computing device(s) 110, as illustrated in FIG. 1.

By way of example and without limitation, the process 700 is illustrated as logical a flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process. In some examples, multiple branches represent alternate implementations that may be used separately or in combination with other operations discussed herein.

At operation 702, the process may include receiving audio data from a plurality of audio sensors associated with a vehicle. In some examples, the audio data may be collected by the audio sensors 110-1, 110-2, 110-3, 110-4, 110-5, 110-6, 110-7, and 110-8 disposed on the vehicle 102, as illustrated in FIG. 1. The plurality of audio sensors may be disposed to cover a 360-degree of area surrounding the vehicle. The audio data may represent the sounds from various audio source(s) in an environment where the vehicle 102 is located. The audio data may represent sounds from a vehicle driving in a same direction as the vehicle 102, sounds from a vehicle driving in an opposite direction from the vehicle 102, sirens from an emergency vehicle, music in the environment, human speech in the environment, dog barking in the environment, construction noise in the environment, etc. In some examples, the siren sounds may be dominant among all the sounds generated in the environment.

At operation 704, the process may include determining an audio sensor pair from the plurality of audio sensors. In some examples, the audio sensor pair may be arbitrarily selected or formed based on all permutations or variations of the audio sensors disposed on the vehicle. In some examples, the operation 704 may be performed by an angular spectrum estimating component 402 of the DoA detection component 120, as illustrated in FIG. 4. In some examples, the plurality of audio sensors may be pre-configured as one or more audio sensor pairs that are disposed on the vehicle to face different areas outside the vehicle. For example, as illustrated in FIG. 1, audio sensor pair [110-1, 110-2] are disposed on a front area of the vehicle 102, audio sensor pair [110-3, 110-4] are disposed on a back area of the vehicle 102, audio sensor pair [110-5, 110-6] are disposed on a right side of the vehicle 102, and audio sensor pair [110-7, 110-8] are disposed on a left side of the vehicle 102. The front area, the back area, the left side and the right side are with respect to a direction of driving of the vehicle 102. In some examples, one or more additional audio sensor pairs may be formed by paring two audio sensors respectively selected from the above-noted four audio sensor pairs. For example, additional audio sensor pair [110-1, 110-7] may be formed, where audio sensor 110-1 and audio sensor 110-7 are respectively selected from audio sensor pair [110-1, 110-2] and audio sensor pair [110-7, 110-8]. It should be understood that the audio sensor pairs may be formed based on any combinations of the audio sensors disposed on the vehicle 102.

At operation 730, the process may include discretizing the audio data into a plurality of audio frames. The length of the audio frames may be preset, for example, 30 milliseconds, although the audio frame may be associated with any length of time.

At operation 732, the process may include inputting the plurality of audio frames into a buffer space, as discussed herein. The audio data may be process from the buffer in a first-in first-out manner.

At operation 706, the process may include estimating, based at least in part on the audio data in each audio frame, an angular spectrum of the audio sensor pair. In some examples, the operation 706 may be performed by an angular spectrum estimating component 402 of the DoA detection component 120, as illustrated in FIG. 4. In some examples, a generalized cross correlation with phase transform (GCC-PHAT) algorithm may be implemented to estimate the angular spectrum of the audio sensor pair. The estimation of angular spectrum may be based at least in part on the assumption that a DoA is represented by a single angle from which an audio signal impinges at the audio sensor pair from an audio source in a far field, the audio signal propagates in free field from the audio source to each audio sensor As the computed TDoA in samples can be converted to DoA in angles, the DoA of an audio event can be determined based at least in part on the peaks of TDoA. The GCC-PHAT algorithm (or other algorithms discussed herein) may be implemented to estimate the angular spectrum associated with the audio sensor pair and output the angular spectrum of the audio sensor pair based at least in part on the audio data.

At operation 708, the process may include determining, based at least in part on the angular spectrum (or the audio data itself), a feature associated with the audio data. In some examples, the operation 708 may be performed by a feature determining component 404 of the DoA detection component 120, as illustrated in FIG. 4. The feature associated with the audio data may be determined based at least in part on the angular spectrum. In some examples, the feature may be selected from the angular spectrum of the audio sensor pair itself, peak values of the angular spectrum of the audio sensor pair, TDoA values at the peaks of the angular spectrum, energy values of the audio sensor pairs, a frequency spectrum, a noise floor, a zero crossing, an energy distribution, a cross correlation, a machine learned embedding, etc.

In some examples, a machine learned component may be implemented on audio data received in real-time to generate the DoA value. An internal buffer may be set to stream the audio data for processing. Audio data received by the audio sensor(s) may be input to the internal buffer in every frame time in a first-in first-out order. The audio data may be streamed into the internal buffer in a preset length of audio frame. For each audio frame, the angular spectrum estimation may be performed and at least a feature may be determined based on the data contained in the audio frame or the estimated angular spectrum. In some examples, the audio frames gaps can be removed to combine audio events and/or audio events below a threshold amount of time or number of frames can be removed.

At operation 710, the process may include determining, based at least in part on the feature, a direction of arrival (DoA) value. In some examples, the operation 708 may be performed by a detection component 408 of the DoA detection component 120, as illustrated in FIG. 4. Referring to the description of the operation 706, the GCC-PHAT algorithm may be implemented to estimate an angular spectrum associated with the audio sensor pair and output the angular spectrum of the audio sensor pair based at least in part on the audio data. One or more features may be extracted based at least in part on the estimated angular spectrum for each audio sensor pair. In some examples, the one or more features may be extracted directly from the audio data. The one or more features may be input to a machined learned model to fuse the one or more features to generate the DoA value. The machine learned model may include a neural network regression (NNR) model.

At operation 712, the process may include determining, based at least in part on the feature, an occurrence of an audio event. In some examples, the operation 708 may be performed by a detection component 408 of the DoA detection component 120, as illustrated in FIG. 4. In some examples, a category of the audio event may be determined based at least in part from the DoA value and an audio event classifier.

At operation 714, the process may include determining, based at least in part on the DoA value, a direction of the audio event relative to the vehicle. In some examples, the operation 708 may be performed by a detection component 408 of the DoA detection component 120, as illustrated in FIG. 4. In some examples, a start time frame indicating an on-set of the audio event based at least in part on the DoA value and an end frame indicating an off-set of the audio event may be determined based at least in part on the DoA value. In some examples, the DoA detection component 120 may determine whether an emergency vehicle associated with the audio event is approaching the vehicle 102, or the emergency vehicle is leaving the vehicle 102 based at least in part on the DoA value using a doppler frequency shifting function.

In some examples, the feature associated with the audio data may be determined based on the raw audio data. At operation 716, the process may include determining the feature associated with the audio data based at least in part on the audio data in each audio frame.

At operation 718, the process may include receiving sensor data from a second perception sensor associated with the vehicle. The second perception sensor associated with the vehicle may include one or more of a lidar sensor, a radar sensor, an image sensor, a time of flight sensor, a sonar sensor, and a location sensor, etc. In some examples, the sensor data may also include environment data captured by the environmental sensor. In some examples, the operation 718 may include receiving other data such as segmentation information, classification information, detections, a size of an object, a velocity of an object, and the like. In some examples, the operation 718 can include receiving map data of an environment whereby likely locations of emergency vehicles can be determined.

At operation 720, the process may include determining, based at least in part on the sensor data and the feature, an occurrence of the audio event. In some examples, the sensor data and the feature associated with the audio data may be taken as different parameters to determine an occurrence of emergency. The determination based on the sensor data and the determination based on the feature associated with the audio data may be assigned with different weights to compute a likelihood of an occurrence of emergency, e.g., a probability value. In at least one example, the image data may be applied to determine the occurrence of emergency. The DoA detection component 120 may determine whether an image of an emergency vehicle is captured based on the image data. In another example, the light signal, i.e., a flashing light, may be applied to determine the occurrence of emergency. The colors of the flashing light may be further used to determine the emergency class. It should be understood that the examples described above is for the purpose of illustration and the present disclosure is not intended to be limiting.

At operation 722, the process may include controlling the vehicle based at least in part on the direction of the audio event relative to the vehicle. For example, the vehicle may be controlled to slow or stop at the current location, pull over to the side, or change to another lane to accommodate the emergency vehicle to pass by. In some examples, the operation 722 can include generating a trajectory for the vehicle to follow. In some examples, the operation 722 can include receiving an instruction from a remote computing device (e.g., a teleoperator) to control the vehicle.

It should be understood that the process 700 is for illustration purpose. The present disclosure is not intended to be limiting. In some examples, multiple emergency audio events may be detected. The process 700 may further include operations to determine DoA or TDoA for each of the multiple emergency audio events.

It should be understood that the audio sensor pairs used to detect the DoA of the emergency vehicle may be selected according to real-time needs. Different locations from which an emergency vehicle emerges may yield different paring of audio sensors for detection. Therefore, once a detection for an emergency vehicle is performed, for example, the operation 714 is completed, the process may return to the operation 704 to prepare for the detection of future emergencies.

Figure 8:
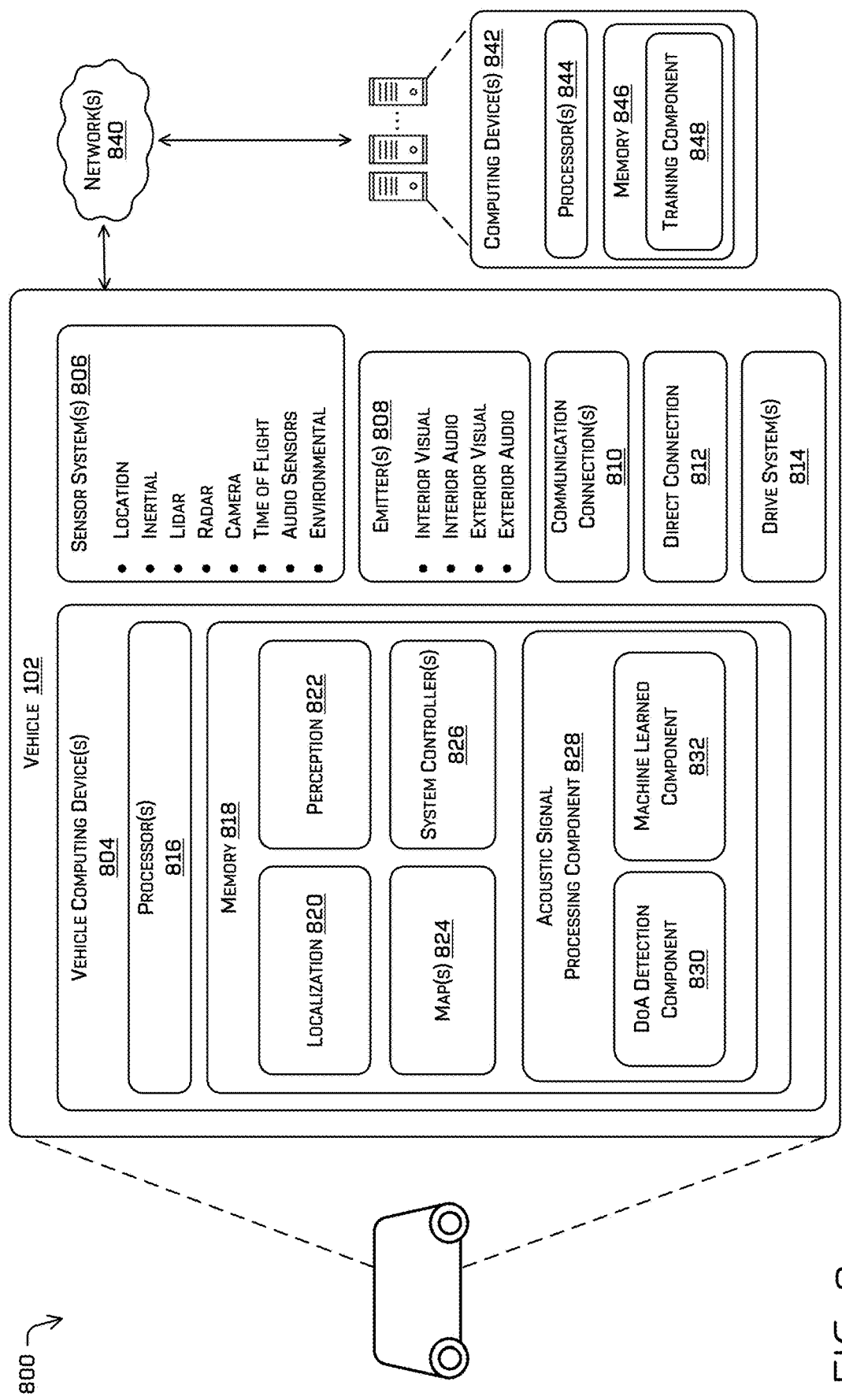
FIG. 8 depicts a block diagram of an example system for implementing the techniques described herein.

FIG. 8 depicts a block diagram of an example system 800 for implementing the techniques described herein.

The vehicle 102 may include one or more vehicle computing devices 804 (also referred to as a vehicle computing device 804 or vehicle computing device(s) 804), one or more sensor systems 806, one or more emitters 808, one or more communication connections 810, at least one direct connection 812, and one or more drive systems 814.

The vehicle computing device 804 may include one or more processors 816 and memory 818 communicatively coupled with the one or more processors 816. In the illustrated example, the vehicle 102 is an autonomous vehicle; however, the vehicle 102 could be any other type of vehicle. In the illustrated example, the memory 818 of the vehicle computing device 804 stores a localization component 820, a perception component 822, one or more maps 824, one or more system controllers 826, an acoustic signal processing component 828 comprising at least a DoA detection component 830 and a machine learned component 832. Though depicted in FIG. 8 as residing in memory 818 for illustrative purposes, it is contemplated that the localization component 820, the perception component 822, the one or more maps 824, the one or more system controllers 826, the acoustic signal processing component 828, the DoA detection component 830, and a machine learned component 832 may additionally, or alternatively, be accessible to the vehicle 102 (e.g., stored remotely).

In at least one example, the localization component 820 may include functionality to receive data from the sensor system(s) 806 to determine a position and/or orientation of the vehicle 102 (e.g., one or more of an x-, y-, z-position, roll, pitch, or yaw). For example, the localization component 820 may include and/or request/receive a map of an environment and may continuously determine a location and/or orientation of the autonomous vehicle within the map. In some instances, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 820 may provide data to various components of the vehicle 102 to determine an initial position of an autonomous vehicle for generating a trajectory and/or for generating or receiving map data, as discussed herein.

In some instances, the perception component 822 may include functionality to perform object detection, segmentation, and/or classification. In some examples, the perception component 822 may provide processed sensor data that indicates a presence of an entity that is proximate to the vehicle 102 and/or a classification of the entity as an entity type (e.g., car, pedestrian, cyclist, animal, building, tree, road surface, curb, sidewalk, unknown, etc.). In additional or alternative examples, the perception component 822 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 818 may further include one or more maps 824 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 824 may include at least one map (e.g., images and/or a mesh). In some examples, the vehicle 102 may be controlled based at least in part on the map(s) 824. In some examples, the one or more maps 824 may be stored on a remote computing device(s) (such as the computing device(s) 842) accessible via network(s) 840. In some examples, multiple maps 824 may be stored based on, for example, a characteristic (e.g., type of entity, time of day, day of week, season of the year, etc.). Storing multiple maps 824 may have similar memory requirements but increase the speed at which data in a map may be accessed.

In at least one example, the vehicle computing device 804 may include one or more system controllers 826, which may be configured to control steering, propulsion, braking, safety, emitters, communication, and other systems of the vehicle 102. These system controller(s) 826 may communicate with and/or control corresponding systems of the drive system(s) 814 and/or other components of the vehicle 102.

In some examples, the acoustic signal processing component 828 may process the audio data received by a plurality of audio sensors associated with the vehicle 102 and determine an occurrence of an emergency and a direction of the emergency relative to the vehicle based at least in part on the audio data. Such an acoustic signal processing component 828 may comprise a DoA detection component, as described herein (for example, DoA detection component 120 in FIG. 1, 4, etc.). The DoA detection component 830 may receive the audio data collected by the audio sensor(s) in the sensor system(s) 806. to determine a direction of arrival given various pairs of sensor data as described herein.

In some examples, the acoustic signal processing component 828 may further comprise a machine learned component 832 (also referred to as a machine learned model component 832), which may include functionality to receive one or more features associated with the audio data from the DoA detection component 830 (and/or from any one or more sensors) and to generate the DoA value, as discussed herein.

In some instances, aspects of some or all of the components discussed herein may include any models, algorithms, and/or machine learning algorithms. For example, in some instances, the components in the memory 818 (and the memory 846, discussed below) may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 806 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 806 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 806 may provide input to the vehicle computing device 804. Additionally, or alternatively, the sensor system(s) 806 may send sensor data, via the one or more networks 840, to the one or more computing device(s) at a particular frequency, after a lapse of a predetermined period of time, in near real-time, etc.

The vehicle 102 may also include one or more emitters 808 for emitting light and/or sound, as described above. The emitters 808 in this example include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connection(s) 810 that enable communication between the vehicle 102 and one or more other local or remote computing device(s). For instance, the communication connection(s) 810 may facilitate communication with other local computing device(s) on the vehicle 102 and/or the drive system(s) 814. Also, the communication connection(s) 810 may allow the vehicle to communicate with other nearby computing device(s) (e.g., other nearby vehicles, traffic signals, etc.). The communications connection(s) 810 also enable the vehicle 102 to communicate with a remote teleoperation computing device or other remote services.

The communications connection(s) 810 may include physical and/or logical interfaces for connecting the vehicle computing device 804 to another computing device or a network, such as network(s) 840. For example, the communications connection(s) 810 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 814. In some examples, the vehicle 102 may have a single drive system 814. In at least one example, if the vehicle 102 has multiple drive systems 814, individual drive systems 814 may be positioned on opposite ends of the vehicle 102 (e.g., the front and the rear, etc.). In at least one example, the drive system(s) 814 may include one or more sensor systems to detect conditions of the drive system(s) 814 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 814. In some cases, the sensor system(s) on the drive system(s) 814 may overlap or supplement corresponding systems of the vehicle 102 (e.g., sensor system(s) 806).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 814. Furthermore, the drive system(s) 814 also include one or more communication connection(s) that enable communication by the respective drive system with one or more other local or remote computing device(s).

In at least one example, the direct connection 812 may provide a physical interface to couple the one or more drive system(s) 814 with the body of the vehicle 102. For example, the direct connection 812 may allow the transfer of energy, fluids, air, data, etc. between the drive system(s) 814 and the vehicle. In some instances, the direct connection 812 may further releasably secure the drive system(s) 814 to the body of the vehicle 102.

In some examples, the vehicle 102 may send sensor data to one or more computing device(s) 842 via the network(s) 840. In some examples, the vehicle 102 may send raw sensor data to the computing device(s) 842. In other examples, the vehicle 102 may send processed sensor data and/or representations of sensor data to the computing device(s) 842. In some examples, the vehicle 102 may send sensor data to the computing device(s) 842 at a particular frequency, after a lapse of a predetermined period of time, in near real-time, etc. In some cases, the vehicle 102 may send sensor data (raw or processed) to the computing device(s) 842 as one or more log files.

The computing device(s) 842 may include processor(s) 844 and a memory 846 storing a training component 848.

In some instances, the training component 848 may include functionality to train a machine learning model to generate the DoA value associated with a detected emergency vehicle. For example, the training component 848 may receive a set of audio data associated with an emergency events, as well as features/parameters associated therewith. In some cases, the set of audio data may represent sounds in an environment for a period of time, such as 5 minutes, 5 hours, 1 day, 1 week, and the like. At least a portion of the set of audio data may be used as an input to train the machine learning model, and at least a portion of the set of audio data may be used as ground truth information for training the machine learning model. As a non-limiting example, a first set (e.g., 3, 4, 5, or more) of a sequence of audio data frames may be input into the machine learned model. A second set of audio data (or feature information associated therefrom—e.g., by extracting an angular spectrum, peaks of the angular spectrum and/or TDoA values at peaks from the angular spectrum, etc.) in the sequence of audio data frames immediately preceding the first set may then be used as ground truth for training the model. Thus, by providing audio data of past detected emergency vehicles in an environment, the DoA detection component may detect an occurrence of emergency vehicles and the orientation of the emergency vehicles efficiently, as discussed herein.

In some examples, the training component 848 may include training data that has been generated by a simulator. For example, simulated training data may represent examples where testing audio sources in an environment, to provide additional training examples.

The processor(s) 816 of the vehicle 102 and the processor(s) 844 of the computing device(s) 842 may be any suitable processor capable of executing instructions to process data and perform operations as described herein. By way of example and not limitation, the processor(s) 816 and 844 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and 846 are examples of non-transitory computer-readable media. The memory 818 and 846 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 818 and 846 may include at least a working memory and a storage memory. For example, the working memory may be a high-speed memory of limited capacity (e.g., cache memory) that is used for storing data to be operated on by the processor(s) 816 and 844. In some instances, the memory 818 and 846 may include a storage memory that may be a lower-speed memory of relatively large capacity that is used for long-term storage of data. In some cases, the processor(s) 816 and 844 may not operate directly on data that is stored in the storage memory, and data may need to be loaded into a working memory for performing operations based on the data, as discussed herein.

It should be noted that while FIG. 8 is illustrated as a distributed system, in alternative examples, components of the vehicle 102 may be associated with the computing device(s) 842 and/or components of the computing device(s) 842 may be associated with the vehicle 102. That is, the vehicle 102 may perform one or more of the functions associated with the computing device(s) 842, and vice versa.

Example Clauses

A. A system comprising: one or more processors; and one or more computer-readable media storing instructions executable by the one or more processors, wherein the instructions, when executed, cause the system to perform operations comprising: receiving audio data from a pair of audio sensors associated with a vehicle; determining, based at least in part on a portion of the audio data, angular spectrum data; determining, based at least in part on the angular spectrum data, a feature associated with the audio data; inputting the feature into a machine learned model; receiving, from the machine learned model, a direction of arrival (DoA) value associated with the audio data; determining, based at least in part on the audio data, an occurrence of sound associated with an emergency vehicle; and determining, based at least in part on the DoA value, a direction of the emergency vehicle relative to the vehicle.

B. The system as paragraph A recites, wherein: the audio data comprises a plurality of audio frames captured over time, determining the angular spectrum data comprises determining a plurality of angular spectra, an angular spectrum of the plurality of angular spectra associated with an audio frame of the plurality of audio frames, determining the feature comprises determining a plurality of features, a feature of the plurality of features associated with an angular spectrum of the plurality of angular spectra, and inputting the feature into the machine learned model comprises inputting the plurality of features into the machine learned model.

C. The system as paragraphs A or B recites, wherein the feature comprises at least one of: a distribution of the angular spectrum data; a peak value of the angular spectrum data; a time difference of arrival (TDoA); or an energy value of the audio data.

D. The system as any one of paragraphs A-C recites, wherein: the audio data is discretized into a plurality of audio frames; wherein determining the occurrence of the sound comprises: inputting, at least a portion of the audio data, into a classifier; and receiving, from the classifier, a classification of the sound, the classification comprising one or more of an ambulance siren class, a police siren class, or a fire truck siren class, and wherein the operations further comprise: determining a start time frame indicating an on-set of the sound; and determining an end time frame indicating an off-set of the sound.

E. The system as any one of paragraphs A-D recites, the operations further comprising: determining an event that starts at the on-set of the sound and ends at the off-set of the sound; determining a count of audio frames associated with the event; and removing the event when the count of audio frames associated with the event is less than a threshold value.

F. A method comprising: receiving audio data from a first audio sensor and a second audio sensor associated with a vehicle; determining a feature associated with the audio data; determining, based at least in part on the feature, a direction of arrival (DoA) value associated with the audio data; determining, based at least in part on the audio data, an occurrence of an audio event; determining, based at least in part on the DoA value, a direction of the audio event relative to the vehicle; and controlling the vehicle based at least in part on the direction of the audio event relative to the vehicle.

G. The method as paragraph F recites, wherein the first audio sensor and the second audio sensor associated with the vehicle comprise at least one of: two audio sensors associated with a front area of the vehicle; two audio sensors associated with a left side of the vehicle; two audio sensors associated with a back area of the vehicle; or two audio sensors associated with a right side of the vehicle; wherein the front area, the back area, the left side, and the right side are with respect to a direction of travel of the vehicle.

H. The method as paragraph F or G recites, further comprising: determining that the audio event comprises an emergency event; and controlling the vehicle further based at least in part on the audio event comprising the emergency event, wherein controlling the vehicle comprises at least one of stopping the vehicle or changing the vehicle to another lane.

I. The method as any one of paragraphs F-H recites, further comprising determining an angular spectrum based at least in part on one of a generalized cross-correlation phase transform algorithm (GCC-PHAT), a multiple signal classification (MUSIC) algorithm, or a state coherence transform (SCT) algorithm, wherein: the feature associated with the audio data is determined based at least in part on the angular spectrum.

J. The method as any one of paragraphs F-I recites, wherein: the audio data comprises a plurality of audio frames, the method further comprising determining, based at least in part on an audio frame of the plurality of audio frames, an angular spectrum of the first audio sensor and the second audio sensor; determining, based at least in part on the angular spectrum, one or more parameters associated with the audio frame; and determining, based at least in part on the one or more parameters, the direction of arrival (DoA) value associated with the audio frame.

K. The method as any one of paragraphs F-J recites, wherein the one or more parameters comprise at least one of: a distribution associated with the angular spectrum; a peak value associated with the angular spectrum; a time difference of arrival (TDoA) value; an energy value of the audio data; a frequency spectrum; a noise floor; a noise spectrum; a zero crossing; an energy distribution; a cross correlation; or a machine learned embedding.

L. The method as any one of paragraphs F-K recites, wherein the audio data is discretized into a plurality of audio frames; wherein determining the occurrence of the audio event comprises: inputting, at least a portion of the audio data, into a classifier; and receiving, from the classifier, a classification of the audio event, the classification comprising one or more of an ambulance siren class, a police siren class, or a fire truck siren class, and wherein the method further comprises: determining a start audio frame indicating an on-set of the audio event; and determining an end audio frame indicating an off-set of the audio event.

M. The method as any one of paragraphs F-L recites, further comprising: determining a first audio event occurred between a first start audio frame and a first end audio frame; determining a count of audio frames associated with the first audio event; and removing the first audio event when the count of audio frames associated with the first audio event is less than a threshold value.

N. The method as any one of paragraphs F-M recites, further comprising: determining a second audio event occurred between a second start audio frame and a second end audio frame; determining a third audio event occurred between a third start audio frame and a third end audio frame; determining a count of audio frames between the second audio event and the third audio event; and removing the count of audio frames between the second audio event and the third audio event when the count of audio frames is less than a threshold value.

O. The method as any one of paragraphs F-N recites, further comprising: determining, based at least in part on Doppler frequency shifting, at least one of the audio event approaching the vehicle or the audio event travelling away from the vehicle.

P. The method as any one of paragraphs F-O recites, wherein the audio event comprises at least one of: an emergency sound class comprising at least one of an ambulance siren class, a police siren class, or a fire truck siren class; or a non-emergency sound class comprising at least one of an engine sound class, a music sound class, a thundering sound class, or a speech sound class.

Q. A non-transitory computer-readable medium storing instructions that, when executed, cause one or more processors to perform operations comprising: receiving audio data from a first audio sensor and a second audio sensor associated with a vehicle; determining a feature associated with the audio data; determining, based at least in part on the feature, a direction of arrival (DoA) value associated with the audio data; determining, based at least in part on the audio data, an occurrence of an audio event; and determining, based at least in part on the DoA value, a direction of the audio event relative to the vehicle; and controlling the vehicle based at least in part on the direction of the audio event relative to the vehicle.

R. The non-transitory computer-readable medium as paragraph Q recites, wherein the audio data comprises a plurality of audio frames, the operations further comprising: determining, based at least in part on an audio frame of the plurality of audio frames, an angular spectrum of the first audio sensor and the second audio sensor; determining, based at least in part on the angular spectrum, one or more parameters associated with the audio frame; and determining, based at least in part on the one or more parameters, the direction of arrival (DoA) value associated with the audio frame.

S. The non-transitory computer-readable medium as paragraph Q or R recites, wherein the one or more parameters comprise at least one of: distributions of the angular spectrum; peak values of the angular spectrum; time difference of arrival (TDoA) values; energy values of the audio data; a frequency spectrum; a noise floor; a noise spectrum; a zero crossing; an energy distribution; a cross correlation; or a machine learned embedding.

T. The non-transitory computer-readable medium as any one of paragraphs Q-S recites, wherein the audio data is discretized into a plurality of audio frames; wherein determining the occurrence of the audio event comprises: inputting, at least a portion of the audio data, into a classifier; and receiving, from the classifier, a classification of the audio event, the classification comprising one or more of an ambulance siren class, a police siren class, or a fire truck siren class, and wherein the operations further comprise: determining a start time frame indicating an on-set of the audio event; and determining an end time frame indicating an off-set of the audio event.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      receiving audio data from a pair of audio sensors associated with a vehicle;
      determining, based at least in part on a portion of the audio data, angular spectrum data;
      determining, based at least in part on the angular spectrum data, at least one of a distribution of the angular spectrum data, a peak value of the angular spectrum data, or an energy value of the audio data;
      inputting into a machine learned model, the at least one of the distribution of the angular spectrum data, the peak value of the angular spectrum data, or the energy value of the audio data;
      determining, by the machine learned model and based at least in part on the at least one of the distribution of the angular spectrum data, the peak value of the angular spectrum data, or the energy value associated with the audio data, a direction of arrival (DoA) value associated with a time difference of arrival (TDoA) value of a peak of the angular spectrum data;
      receiving, from the machine learned model, the DoA value;
      determining, based at least in part on the audio data, an occurrence of sound associated with an emergency vehicle; and
      determining, based at least in part on the DoA value, a direction of the emergency vehicle relative to the vehicle.

2. The system of claim 1, wherein:
   the audio data comprises a plurality of audio frames captured over time, and
   determining the angular spectrum data comprises determining a plurality of angular spectra, an angular spectrum of the plurality of angular spectra associated with an audio frame of the plurality of audio frames.

3. The system of claim 1, wherein:
   the audio data is discretized into a plurality of audio frames;
   wherein determining the occurrence of the sound comprises:
      inputting, at least a portion of the audio data, into a classifier; and
      receiving, from the classifier, a classification of the sound, the classification comprising one or more of an ambulance siren class, a police siren class, or a fire truck siren class, and
   wherein the operations further comprise:
      determining a start time frame indicating an on-set of the sound; and
      determining an end time frame indicating an off-set of the sound.

4. The system of claim 3, the operations further comprising:
   determining an event that starts at the on-set of the sound and ends at the off-set of the sound;
   determining a count of audio frames associated with the event; and
   removing the event when the count of audio frames associated with the event is less than a threshold value.

5. The system of claim 1, wherein the machine learned model is a neural network.

6. A method comprising:
   receiving audio data from a first audio sensor and a second audio sensor associated with a vehicle;
   determining at least one of a distribution of angular spectrum data, a peak value of the angular spectrum data, or an energy value associated with the audio data;
   inputting into a machine learned model, the at least one of the distribution of the angular spectrum data, the peak value of the angular spectrum data, or the energy value of the audio data;
   determining, by the machine learned model and based at least in part on the at least one of the distribution of the angular spectrum data, the peak value of the angular spectrum data, or the energy value associated with the audio data, a direction of arrival (DoA) value associated with a time difference of arrival (TDoA) value of a peak of the angular spectrum data;
   receiving, from the machine learned model, the DoA value;
   determining, based at least in part on the audio data, an occurrence of an audio event;
   determining, based at least in part on the DoA value, a direction of the audio event relative to the vehicle; and
   controlling the vehicle based at least in part on the direction of the audio event relative to the vehicle.

7. The method of claim 6, wherein the first audio sensor and the second audio sensor associated with the vehicle comprise at least one of:
   two audio sensors associated with a front area of the vehicle;
   two audio sensors associated with a left side of the vehicle;
   two audio sensors associated with a back area of the vehicle; or
   two audio sensors associated with a right side of the vehicle;
   wherein the front area, the back area, the left side, and the right side are with respect to a direction of travel of the vehicle.

8. The method of claim 6, further comprising:
   determining that the audio event comprises an emergency event; and
   controlling the vehicle further based at least in part on the audio event comprising the emergency event, wherein controlling the vehicle comprises at least one of stopping the vehicle or changing the vehicle to another lane.

9. The method of claim 6, further comprising determining the angular spectrum data based at least in part on one of a generalized cross-correlation phase transform algorithm (GCC-PHAT), a multiple signal classification (MUSIC) algorithm, or a state coherence transform (SCT) algorithm.

10. The method of claim 6, wherein:
    the audio data comprises a plurality of audio frames, the method further comprising:
    determining, based at least in part on an audio frame of the plurality of audio frames, an angular spectrum of the first audio sensor and the second audio sensor;
    determining, based at least in part on the angular spectrum, one or more parameters associated with the audio frame; and determining, based at least in part on the one or more parameters, the DoA value associated with the audio frame.

11. The method of claim 10, wherein the one or more parameters comprise at least one of:
TDoA values;
a frequency spectrum;
a noise floor;
a noise spectrum;
a zero crossing;
an energy distribution; or
a cross correlation.

12. The method of claim 6, wherein
the audio data is discretized into a plurality of audio frames;
wherein determining the occurrence of the audio event comprises:
inputting, at least a portion of the audio data, into a classifier; and
receiving, from the classifier, a classification of the audio event, the classification comprising one or more of an ambulance siren class, a police siren class, or a fire truck siren class, and
wherein the method further comprises:
determining a start audio frame indicating an on-set of the audio event; and
determining an end audio frame indicating an off-set of the audio event.

13. The method of claim 12, further comprising:
determining a first audio event occurred between a first start audio frame and a first end audio frame;
determining a count of audio frames associated with the first audio event; and
removing the first audio event when the count of audio frames associated with the first audio event is less than a threshold value.

14. The method of claim 12, further comprising:
determining a second audio event occurred between a second start audio frame and a second end audio frame;
determining a third audio event occurred between a third start audio frame and a third end audio frame;
determining a count of audio frames between the second audio event and the third audio event; and
removing the count of audio frames between the second audio event and the third audio event when the count of audio frames is less than a threshold value.

15. The method of claim 14, further comprising:
determining, based at least in part on Doppler frequency shifting, at least one of the audio event approaching the vehicle or the audio event travelling away from the vehicle.

16. The method of claim 6, wherein the audio event comprises at least one of:
an emergency sound class comprising at least one of an ambulance siren class, a police siren class, or a fire truck siren class; or
a non-emergency sound class comprising at least one of an engine sound class, a music sound class, a thundering sound class, or a speech sound class.

17. A non-transitory computer-readable medium storing instructions that, when executed, cause one or more processors to perform operations comprising:
receiving audio data from a first audio sensor and a second audio sensor associated with a vehicle;
determining at least one of a distribution of angular spectrum data, a peak value of the angular spectrum data, or an energy value associated with the audio data;
inputting into a machine learned model, the at least one of the distribution of the angular spectrum data, the peak value of the angular spectrum data, or the energy value of the audio data;
determining, by the machine learned model and based at least in part on the at least one of the distribution of the angular spectrum data, the peak value of the angular spectrum data, or the energy value associated with the audio data, a direction of arrival (DoA) value associated with a time difference of arrival (TDoA) value of a peak of the angular spectrum data;
receiving, from the machine learned model, the DoA value;
determining, based at least in part on the audio data, an occurrence of an audio event;
determining, based at least in part on the DoA value, a direction of the audio event relative to the vehicle; and
controlling the vehicle based at least in part on the direction of the audio event relative to the vehicle.

18. The non-transitory computer-readable medium of claim 17, wherein the audio data comprises a plurality of audio frames, the operations further comprising:
determining, based at least in part on an audio frame of the plurality of audio frames, an angular spectrum of the first audio sensor and the second audio sensor;
determining, based at least in part on the angular spectrum, one or more parameters associated with the audio frame; and
determining, based at least in part on the one or more parameters, the DoA value associated with the audio frame.

19. The non-transitory computer-readable medium of claim 18, wherein the one or more parameters comprise at least one of:
TDoA values;
a frequency spectrum;
a noise floor;
a noise spectrum;
a zero crossing;
an energy distribution;
a cross correlation; or
a machine learned embedding.

20. The non-transitory computer-readable medium of claim 17, wherein the audio data is discretized into a plurality of audio frames;
wherein determining the occurrence of the audio event comprises:
inputting, at least a portion of the audio data, into a classifier; and
receiving, from the classifier, a classification of the audio event, the classification comprising one or more of an ambulance siren class, a police siren class, or a fire truck siren class, and
wherein the operations further comprise:
determining a start time frame indicating an on-set of the audio event; and
determining an end time frame indicating an off-set of the audio event.

* * * * *